US008750321B2

United States Patent
Roy

(10) Patent No.: US 8,750,321 B2
(45) Date of Patent: Jun. 10, 2014

(54) METHOD AND SIGNALING TO ENHANCE ASSOCIATION IN MESH SYSTEMS

(75) Inventor: Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 34 days.

(21) Appl. No.: 13/286,859

(22) Filed: Nov. 1, 2011

(65) Prior Publication Data
US 2012/0099457 A1   Apr. 26, 2012

Related U.S. Application Data

(63) Continuation of application No. 11/445,390, filed on May 31, 2006, now Pat. No. 8,068,507.

(60) Provisional application No. 60/690,244, filed on Jun. 14, 2005.

(51) Int. Cl.
*H04L 12/28* (2006.01)
*H04W 48/20* (2009.01)
*H04W 24/00* (2009.01)
*H04W 88/08* (2009.01)
*H04W 40/12* (2009.01)

(52) U.S. Cl.
CPC .............. *H04W 48/20* (2013.01); *H04W 24/00* (2013.01); *H04W 88/08* (2013.01); *H04W 40/12* (2013.01)
USPC .......................................... 370/406; 455/455

(58) Field of Classification Search
CPC .................................................. H04W 48/20
USPC ................... 370/406, 338; 455/455
See application file for complete search history.

(56) References Cited

U.S. PATENT DOCUMENTS

| 5,606,551 | A | * | 2/1997 | Kartalopoulos | ............ 370/406 |
| 5,907,540 | A | | 5/1999 | Hayashi | |
| 6,067,297 | A | | 5/2000 | Beach | |
| 6,741,862 | B2 | | 5/2004 | Chung et al. | |

(Continued)

FOREIGN PATENT DOCUMENTS

| JP | 9-233125 | 9/1997 |
| JP | 2000-209268 | 7/2000 |

(Continued)

OTHER PUBLICATIONS

Communication from a Foreign Patent Office in a Counterpart Application, Jun. 25, 2010, 3 pages.

(Continued)

*Primary Examiner* — Wei Zhao
(74) *Attorney, Agent, or Firm* — Julian F. Santos

(57) ABSTRACT

A method and system for conveying backhaul link information for intelligent selection of a mesh access point (MAP) in a mesh network are disclosed. The mesh network includes a plurality of MAPs. The MAPs send backhaul link information regarding backhaul connections between each MAP and any interconnections in the mesh network to a wireless transmit/receive unit (WTRU). The WTRU then determines a performance value with respect to the MAPs based on the backhaul link information and selects one of the MAPs to associate with based on the performance value. The WTRU may send information about interconnection needs of the WTRU to the MAPs, and the MAPs may generate the backhaul link information based on the interconnection needs of the WTRU.

18 Claims, 2 Drawing Sheets

(56) References Cited

U.S. PATENT DOCUMENTS

| | | | |
|---|---|---|---|
| 7,016,328 B2 | 3/2006 | Chari et al. | |
| 7,039,417 B2 | 5/2006 | Lyle et al. | |
| 7,061,925 B2 | 6/2006 | Joshi | |
| 7,280,483 B2 | 10/2007 | Joshi | |
| 7,412,241 B2 | 8/2008 | Strutt | |
| 7,496,680 B2 | 2/2009 | Canright | |
| 7,558,818 B2 | 7/2009 | Joshi et al. | |
| 7,801,490 B1* | 9/2010 | Scherzer | 455/67.13 |
| 8,068,507 B2* | 11/2011 | Roy | 370/406 |
| 2002/0159409 A1 | 10/2002 | Wolfe et al. | |
| 2002/0172186 A1 | 11/2002 | Larsson | |
| 2003/0091001 A1 | 5/2003 | Watanabe | |
| 2003/0139197 A1 | 7/2003 | Kostic et al. | |
| 2004/0004998 A1 | 1/2004 | Fitton et al. | |
| 2004/0039817 A1 | 2/2004 | Lee et al. | |
| 2004/0137908 A1 | 7/2004 | Sinivaara et al. | |
| 2004/0246935 A1 | 12/2004 | Joshi et al. | |
| 2004/0246975 A1 | 12/2004 | Joshi | |
| 2004/0253924 A1 | 12/2004 | Acampora | |
| 2004/0260808 A1 | 12/2004 | Strutt | |
| 2004/0264435 A1 | 12/2004 | Chari et al. | |
| 2005/0020295 A1 | 1/2005 | Attar et al. | |
| 2005/0070294 A1 | 3/2005 | Lyle et al. | |
| 2006/0185013 A1 | 8/2006 | Oyama et al. | |
| 2006/0268727 A1 | 11/2006 | Rangarajan et al. | |
| 2006/0268791 A1* | 11/2006 | Cheng et al. | 370/338 |
| 2006/0291410 A1* | 12/2006 | Herrmann | 370/328 |
| 2007/0147241 A1 | 6/2007 | Wang | |
| 2008/0310340 A1 | 12/2008 | Isozu | |

FOREIGN PATENT DOCUMENTS

| | | |
|---|---|---|
| JP | 2000-341320 | 12/2000 |
| JP | 2003-219472 | 7/2003 |
| JP | 2004-266519 | 9/2004 |
| JP | 2004-282695 | 10/2004 |
| JP | 2005-64721 | 3/2005 |
| JP | 2005-79827 | 3/2005 |
| JP | 2006-526937 | 11/2006 |
| JP | 2005-033557 | 2/2013 |
| TW | 200511866 | 3/2005 |
| TW | 200518601 | 6/2005 |
| WO | WO-02/11329 | 2/2002 |
| WO | WO-2004/084503 | 9/2004 |
| WO | WO-2004/084583 A2 | 9/2004 |
| WO | 2004/109474 A2 | 12/2004 |
| WO | 2004/109536 A1 | 12/2004 |
| WO | 2004/114690 A1 | 12/2004 |

OTHER PUBLICATIONS

IEEE Wireless LAN Edition, "A Compilation Based on IEEE Std 802.11TM-1999 (R2003) and its amendments", Jun. 12, 2003, 527 pages.
Agre, Jonathan et al., "Secure Nomadic Wireless Mesh (SnowMesh) 802.11 TGs ESS Mesh Networking Propose", IEEE 802.11-05/xxxxxr0, May 15, 2005, 56 pages.
Baker, Dennis J. et al., "Proposal for a Dynamic Backbone Mesh", IEEE 802.11-05/0142r0, Mar. 16, 2005, 23 pages.
"European Office Action", European Application No. 11157693.0, Jul. 1, 2013, 7 Pages.
"Taiwanese Notice of Examination", Taiwanese Application No. 098120752, Mar. 7, 2013, 7 pages.
"Taiwanese Notice of Examination (Translation)", Taiwanese Application No. 098120752, Mar. 7, 2013, 6 pages.
"Japanese Notice of Rejection", Japanese Application No. 2012-229863, Nov. 5, 2013, 3 pages.
"Japanese Notice of Rejection (English Translation)", Japanese Application No. 2012-229863, Nov. 5, 2013, 3 pages.
"Taiwanese Examination Notification", Taiwanese Patent Application No. 098120752, Nov. 18, 2013, 7 pages.
"Taiwanese Examination Notification (English Translation)", Taiwanese Patent Application No. 098120752, Nov. 18, 2013, 5 pages.

* cited by examiner

METHOD AND SIGNALING TO ENHANCE ASSOCIATION IN MESH SYSTEMS

CROSS REFERENCE TO RELATED APPLICATION

This application is a continuation application of U.S. patent application Ser. No. 11/445,390, filed May 31, 2006, which application claims the benefit of U.S. Provisional Patent Application Ser. No. 60/690,244 filed Jun. 14, 2005, each of which is incorporated by reference as if fully set forth herein.

FIELD OF INVENTION

The present invention is related to a wireless communication system. More particularly, the present invention is related to a method and system for conveying backhaul link information for intelligent selection of a mesh access point (MAP) in a mesh network.

BACKGROUND

A conventional wireless network includes a set of access points (APs), (also known as base stations), each of which is connected to a backhaul network. In certain deployments, the cost of directly connecting a given AP to the backhaul network is too high. Thus, indirectly connecting the AP to the backhaul network may be more attractive. This indirect connection is typically accomplished by relaying information to and from neighboring APs in a mesh network. This is referred to as a mesh architecture.

A mesh network is a local area network (LAN) including a plurality of mesh points (MPs). The connections between the MPs may be wired or wireless. The points of interconnection between a mesh system and a non-mesh system are referred to as portals. A mesh system with multiple portals is referred to as a multi-portal mesh system. A node capable of both AP and MP functionalities is referred to as a mesh access point (MAP). FIG. 1 shows an exemplary mesh network 100. The mesh network 100 includes a plurality of MPs 102, a plurality of MAPs 104 and a mesh portal 106. The MPs 102 serve as forwarding and relaying nodes in the mesh network 100. The MPs 102 receive traffic on incoming links and forward the traffic on outgoing links. The MAPs 104 are also MPs with an interface to provide radio access to a plurality of wireless transmit/receive units (WTRUs) 108 to provide wireless services in a certain geographic area. The mesh portal 106 provides connectivity to a backbone network 110, (such as the Internet), in the mesh network 100. Thus, the mesh portal 106 acts as an MP with a special interface to the backbone network 110. Each of the WTRUs 108 communicates with another WTRU in the mesh network 100, or to the backbone network 110, via the MAPs 104 and the mesh portal 106. The MAPs 104 forward the traffic generated by the WTRUs 108 to another MAP 104 or the mesh portal 106 by relaying the traffic via intermittent MPs 102 and/or MAPs 104.

A mesh network is reliable and offers redundancy. Even if one or more of the MPs can no longer operate, the rest of the MPs can still communicate with each other, directly or through one or more intermediate MPs such that the network may function properly. Other considerations, such as ease and speed of deployment, are advantages of the mesh network since a mesh network may be deployed without having to provide direct backhaul links and interconnection modules for each MP in the mesh network.

In conventional non-mesh wireless communication systems, a WTRU needs to estimate which AP will provide the best communication link to the WTRU. WTRUs typically use the following information and methods for determining which AP to associate with:

1) the identity of the network of which a candidate AP is a part of, (e.g., in IEEE 802.11 systems, this identity corresponds to the service set identifier (SSID) provided to the WTRUs in a beacon frame or a probe response frame);

2) the capabilities of the candidate AP including information regarding which services the AP supports, (e.g., in IEEE 802.11 systems, this capability information is included in a capability information field in a beacon frame or a probe response frame); or 3) the expected achievable data throughput, (e.g., the WTRU may estimate the expected throughput by measuring a received power it perceives from an AP on beacon frames, probe response frames or any other frames). The received power, a signal-to-interference-plus-noise-ratio (SINR) or similar measurements typically sets the maximum rate the WTRU may achieve on a given communication link. The WTRU can also use channel occupancy or channel load measurements, whether measured by the WTRU or collected from the AP, to refine the expected throughput estimate.

The above-described information and methods utilized to select an AP that a WTRU should associate with are no longer adequate in a mesh network. For example, in a conventional infrastructure mode WLAN, the throughput achieved on a given WTRU-AP link depends only on the characteristics of that particular radio link between the AP and the WTRU, (i.e., channel occupancy, received power, a signal-to-interference and noise ratio (SINR), or the like). However, in a mesh network, the throughput not only depends on the characteristics of the radio link between a given WTRU and its serving MAP, but it also depends on the characteristics of the radio link(s) between the serving MAP and other intermediate MPs that forward the traffic from the serving MAP to the mesh portal.

FIG. 2 illustrates an example of an intelligent association problem in a conventional mesh network 200. In this example, the mesh network 200 comprises three MAPs 201, 202 and 203. The MAPs 201 and 203 are mesh portals which have connectivity to the Internet 230 via a router 220. The interconnection resources of the MAPs 201, 203 may be Ethernet-based. In this example, the MAP 202 and the MAP 203 are candidate MAPs for a WTRU 210. If the WTRU 210 is associated with the MAP 102, traffic to/from the Internet 230 is routed via radio links L2 and L1 via the MAP 201. If the WTRU 210 is associated with the MAP 203, the traffic to/from the Internet 230 is routed via radio link L3. An exemplary set of radio link characteristics for the radio links L1, L2 and L3 is illustrated in Table 1 below.

TABLE 1

| Radio link | Nodes | | SNR | Transmission rate | Single-link throughput |
|---|---|---|---|---|---|
| L1 | MAP1 | MAP2 | 10 dB | 12 Mbps | 5 Mbps |
| L2 | STA | MAP2 | 35 dB | 54 Mbps | 20 Mbps |
| L3 | STA | MAP3 | 20 dB | 36 Mbps | 15 Mbps |

According to Table 1, if the WTRU 210 associates with the MAP 203, the throughput would be 15 Mbps. However, if the WTRU 210 associates with the MAP 202, the throughput would be determined by the combination of data throughput of two links L1, L2, which is typically estimated as follows:

$$1/(1/\text{throughput\_L1} + 1/\text{throughput\_L2}). \quad \text{Equation (1)}$$

Applying Equation (1) to radio links L1 and L2, the combined throughput would be 1/(1/5+1/20) or 4 Mbps. From this calculation it becomes evident that the WTRU 210 will experience a better throughput by associating with the MAP 203 than by associating with the MAP 202. From the perspective of the overall mesh network 200, the preferred association of the WTRU 210 is to the MAP 203. The radio connection of L1 and L2 between the WTRU 210 and the MAP 201 offers 3.75 times (i.e. 15 Mbps/4 Mbps) less throughput than the multi-hop radio connection between the WTRU 210 and the MAP 203.

According to the prior art, in the foregoing example, the radio link L2 between the WTRU 210 and the MAP 202 seems more attractive, (in terms of signal-to-noise ratio (SNR), estimated achievable transmission rate, estimate single-link throughput, channel occupancy, or the like), than the radio link L3 between the WTRU 210 and the MAP 203. In the prior art, since the WTRU 210 has no means of knowing that associating with the MAP 203 will result in a better throughput than associating with the MAP 202, the WTRU 210 may end up with a less favorable MAP.

Accordingly, it is desirable to have a method and apparatus for enabling a WTRU to intelligently associate with a MAP in a mesh network.

SUMMARY

The present invention is related to a method and system for conveying backhaul link information for intelligent selection of a mesh access point (MAP) in a mesh network. The mesh network includes a plurality of MAPs. The MAPs send backhaul link information regarding backhaul connections between each MAP and any interconnections in the mesh network to a WTRU. The WTRU then determines a performance value with respect to the MAPs based on the backhaul link information and selects one of the MAPs to associate with based on the performance value. The WTRU may send information about interconnection needs of the WTRU to the MAPs, and the MAPs may generate the backhaul link information based on the interconnection needs of the WTRU.

In prior art systems, a WTRU may associate to a MAP that will result in worse performance than other MAPs because the WTRU has no means of knowing about the performance of the different radio links that are used to convey its traffic to/from a desired mesh portal. In accordance with the present invention, a WTRU may estimate the expected throughput for the end-to-end connection, which allows the WTRU to associate to a MAP that provides the best performance from the point of view of both the WTRU and the overall system.

DETAILED DESCRIPTION OF THE PREFERRED EMBODIMENTS

When referred to hereafter, the terminology "WTRU" includes but is not limited to a user equipment, a mobile station, a fixed or mobile subscriber unit, a pager, or any other type of device capable of operating in a wireless environment. When referred to hereafter, the terminology "MAP" includes but is not limited to a base station, a Node-B, a site controller, an access point or any other type of interfacing device that has a mesh functionality in a wireless environment.

The features of the present invention may be incorporated into an integrated circuit (IC) or be configured in a circuit comprising a multitude of interconnecting components.

Figure 1:
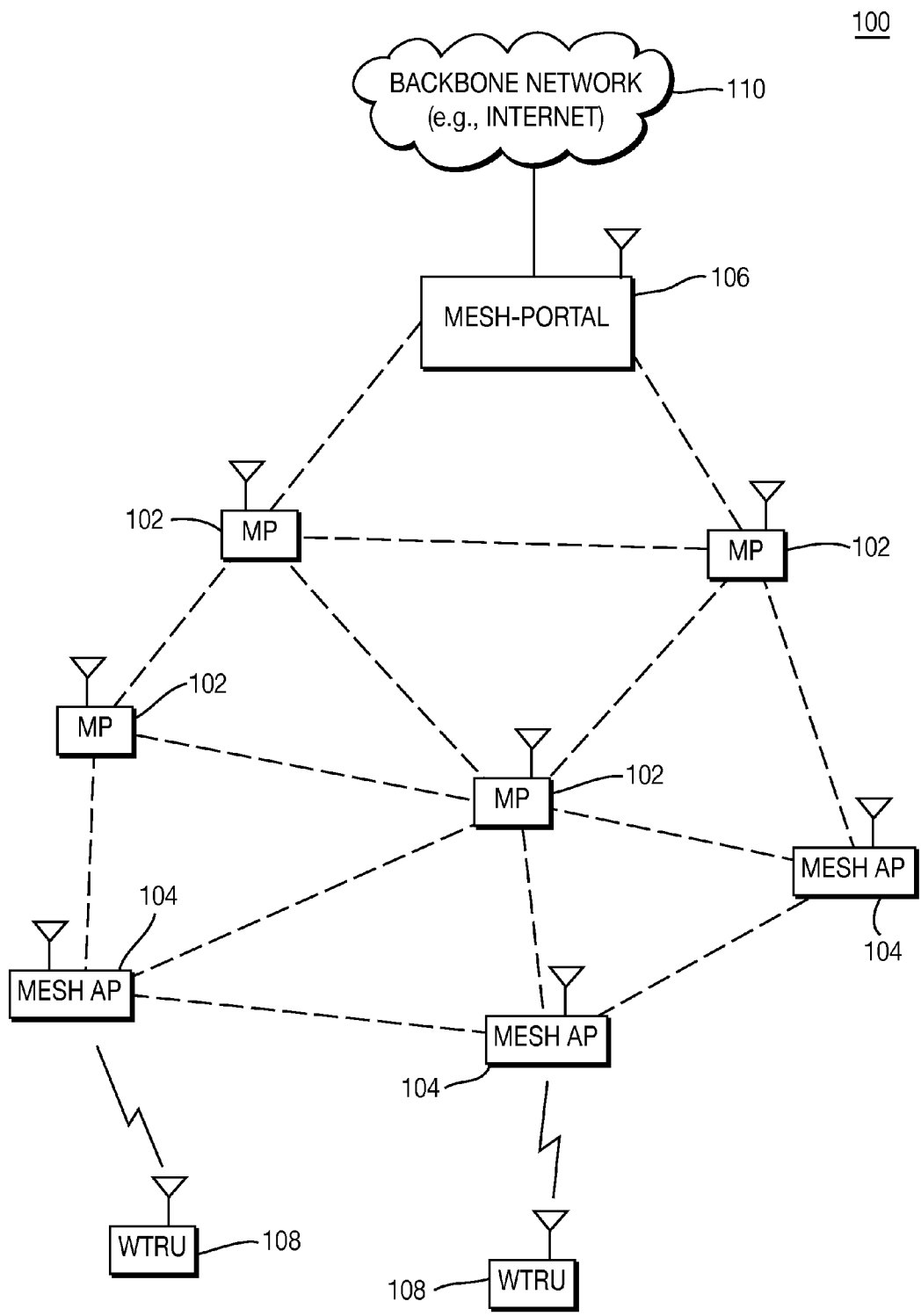
FIG. 1 is an exemplary block diagram of a conventional mesh network.
Figure 2:
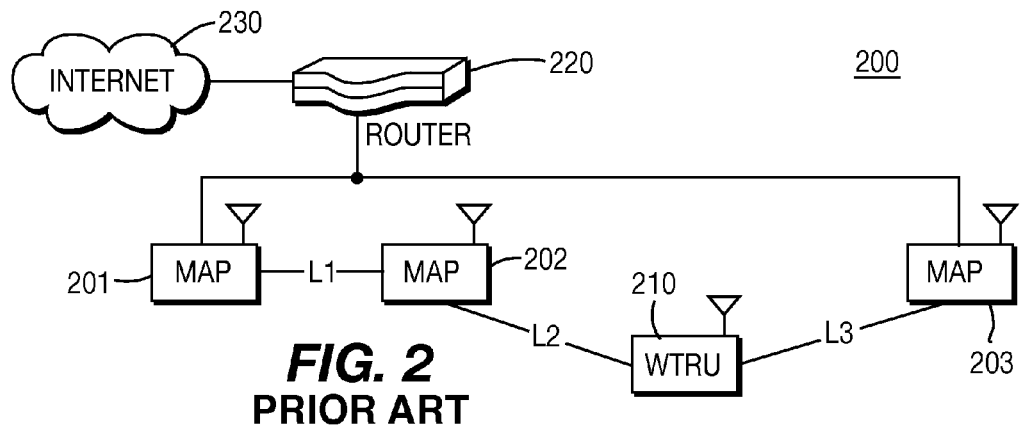
FIG. 2 illustrates an example of an intelligent association problem in a conventional mesh network.
Figure 3:
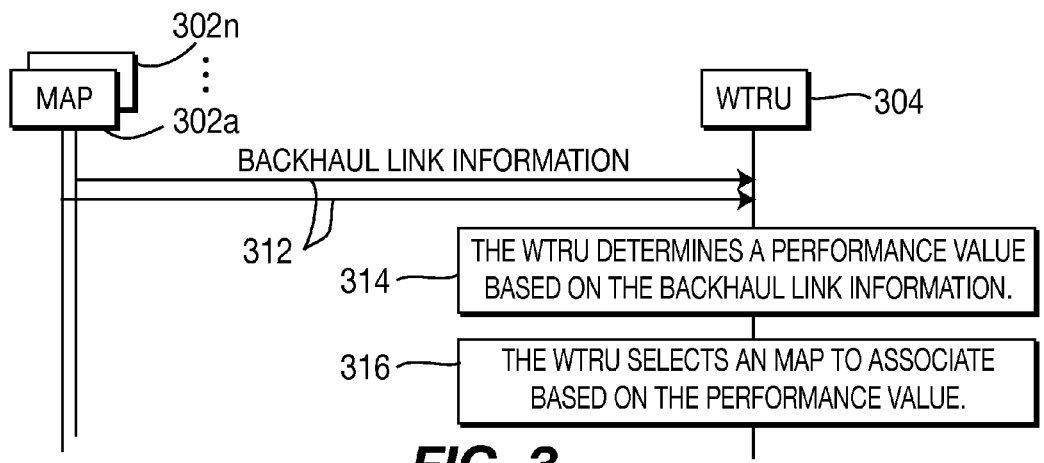
FIG. 3 is a signaling diagram between a MAP and a WTRU for selecting a MAP in a mesh network in accordance with an embodiment of the present invention.

FIG. 3 is a signaling diagram between MAPs $302a$-$302n$ and a WTRU 304 for selecting one of the MAPs $302a$-$302n$ to associate with in accordance with an embodiment of the present invention. At least one of the MAPs $302a$-$302n$ in the mesh network sends backhaul link information regarding backhaul connections between each of the MAPs $302a$-$302n$ and any interconnections in the mesh network to the WTRU 304 (step 312). The backhaul link information may be broadcast, (e.g., via a beacon frame), in a region covered by each of the MAPs $302a$-$302n$ or may be sent via unicast, (e.g., via a probe response frame), to a particular WTRU. Of course, other methods known to those skilled in the art may also be used to provide backhaul link information to WTRUs, in accordance with the present invention.

The backhaul link information that each of the MAPs $302a$-$302n$ sends to the WTRU 304 includes, but is not limited to: 1) the number of portals each MAP $302a$-$302n$ can communicate with; 2) the number of routes separated from each MAP $302a$-$302n$ to a mesh portal; 3) the number of hops and/or the number of MPs per route separated from each MAP $302a$-$302n$ to a mesh portal; 4) an average transmission rate used on each radio link, or by each of the different MPs, involved in the forwarding of packets between each MAP $302a$-$302n$ and a mesh portal; 5) an estimated throughput per radio link, or per MP, involved in the forwarding of packets between each MAP $302a$-$302n$ and a mesh portal; 6) channel occupancy perceived on each radio link, or by each MP, involved in the forwarding of packets between each MAP $302a$-$302n$ and a mesh portal; 7) radio resources allocated on each radio link, or by each MP, involved in the forwarding of packets between each of the MAPs $302a$-$302n$ and a mesh portal; 8) quality experienced on each radio link, or by each MP, involved in the forwarding of packets between each of the MAPs $302a$-$302n$ and a mesh portal, (e.g., queued time, medium access delay, time jitter, time latency, a packet error rate); and 9) any performance metric comprising a weighted sum or any other combination of the above-mentioned metrics.

The WTRU 304 then determines an end-to-end performance value with respect to each of the MAPs $302a$-$302n$ based on the received backhaul link information (step 314). The backhaul link information enables the WTRU 304 to intelligently estimate the end-to-end performance value after associating with a particular MAP $302a$-$302n$. For example, the WTRU 304 may estimate a data throughput that the WTRU 304 can expect along an end-to-end radio connection by associating with a particular MAP $302a$-$302n$.

The WTRU 304 then selects one of the MAPs $302a$-$302n$ to associate with based on the performance value (step 316). Unlike conventional methods of making an association decision, the decision is not solely based on the expected performance, (e.g., expected throughput), of the direct radio link between the WTRU 304 and a particular MAP 302a-302n, but on the end-to-end performance value, such as end-to-end throughput.

Figure 4:
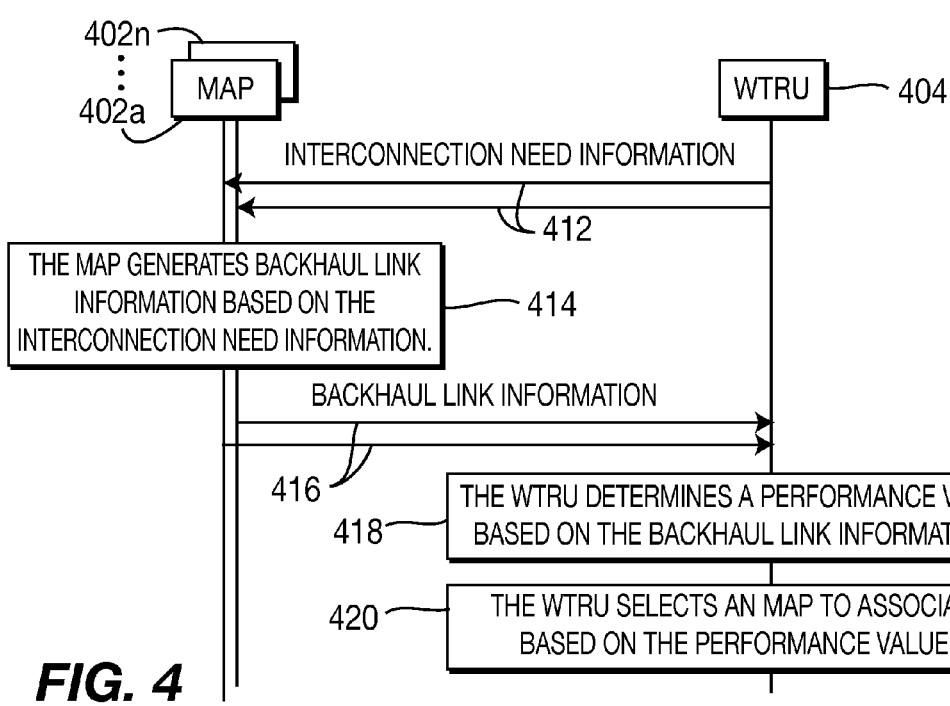
FIG. 4 is a signaling diagram between a MAP and a WTRU for selecting a MAP in a mesh network in accordance with another embodiment of the present invention.

FIG. 4 is a signaling diagram between at least one MAP 402a-402n and a WTRU 404 for selecting one of the MAPs 402a-402n in accordance with another embodiment of the present invention. In this embodiment, the MAPs 402a-402n generate the backhaul link information based on interconnection needs of the WTRU 404 in terms of a particular mesh portal or a particular MAP 402a-402n. As the interconnection needs may vary from one WTRU 404 to another, it may be desirable for a MAP 402a-402n to know the interconnection needs, (e.g., a desired mesh portal), of a given WTRU 404 in order for the MAP 402a-402n to communicate backhaul link information that is relevant to the WTRU 404.

The WTRU 404 sends a message for interconnection needs of the WTRU 404 to at least one MAP 402a-402n (step 412). Information included in the message includes, but is not limited to: 1) an IP address that the WTRU 404 desires to connect with; 2) a medium access control (MAC) address of the nodes that the WTRU 404 wants to connect with; 3) an address allowing a MAP 402a-402n to identify a given mesh portal from other mesh portals; 4) a subnet address that the WTRU 404 wants to connect with; and 5) a predetermined code or flag which allows a MAP 402a-402n to determine the connectivity needs of the WTRU 404. The message may be sent via a probe request frame, a special control frame, as part of the body of a data frame, a broadcast frame, or any other type of frames.

Each of the MAPs 402a-402n generates backhaul link information based on the interconnection needs of the WTRU 404 (step 414). For example, a WTRU that needs to connect to the Internet may be interested in choosing a MAP that offers the best route to a mesh portal interconnecting the mesh network to the Internet. On the other hand, a WTRU located in a given basic service set (BSS) that is interested in communicating with another WTRU located in a neighboring BSS would choose a MAP offering the best route to the a base station, (or a MAP), serving that neighbor BSS.

Each of the MAPs 402a-402n then sends the backhaul link information to the WTRU 404 (step 416). The backhaul link information may be broadcast, (e.g., via a beacon frame), or may be unicast directly to the WTRU 404, (e.g., via a probe response frame).

The WTRU 404 then determines an end-to-end performance value with respect to each of the MAPs 402a-402n based on the received backhaul link information (step 418). The backhaul link information enables the WTRU 404 to intelligently estimate an end-to-end performance value after associating with a particular MAP 402a-402n. For example, the WTRU 404 may estimate a data throughput the WTRU 404 can expect along an end-to-end radio connection by associating with a particular MAP 402a-402n. The WTRU 404 then selects one of the MAPs 402a-402n to associate with based on the performance value (step 420).

It is also possible for the MAP to communicate to the WTRU all backhaul link information without any regards to the interconnection needs of the WTRU.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in a wireless transmit/receive unit (WTRU) for selectively associating with one of a plurality of base stations of a mesh network, the method comprising:
   transmitting, from the WTRU, an address of a node with which the WTRU desires to connect;
   receiving, at the WTRU from the plurality of base stations, a respective plurality of backhaul link information including estimated throughputs related to respective communication paths between the plurality base stations and the transmitted address;
   determining based on the received plurality of backhaul link information and radio link characteristics of respective radio links between the WTRU and the base stations, end-to-end performance values associated with the WTRU and the communication paths; and
   associating with one of the base stations based on the end-to-end performance values, wherein:
   the plurality of base stations comprises first and second base stations,
   the backhaul link information comprises first and second backhaul link information,
   the first backhaul link information is related to the first base station and to the transmitted address,
   the second backhaul link information is related to the second base station and to the transmitted address,
   the first backhaul link information comprises any or any combination of a first number of nodes, base stations and gateways associated with the mesh network intervening between the first base station and the transmitted address, and
   the second backhaul link information comprises any or any combination of a second number of nodes, base stations and gateways associated with the mesh network intervening between the second base station and the transmitted address.

2. The method of claim 1, wherein transmitting an address comprises:
   transmitting the address via at least one of a probe request frame, a special control frame, a data frame, or a broadcast frame.

3. A wireless transmit/receive unit (WTRU) comprising:
   a transmitter configured to transmit, to a plurality of base stations of a mesh network, an address of a node with which the WTRU desires to connect;
   a receiver configured to receive, from the plurality of base stations, a respective plurality of backhaul link information including estimated throughputs related to respective communications paths between the plurality base stations and the transmitted address;
   a processor configured to:
   determine, based on the received plurality of backhaul link information and radio link characteristics of respective radio links between the WTRU and the base stations, end-to-end performance values associated with the WTRU and the communication paths; and
   associate with one of the base stations based on the end-to-end performance values, wherein:
   the plurality of base stations comprises first and second base stations,
   the backhaul link information comprises first and second backhaul link information,
   the first backhaul link information is related to the first base station and to the transmitted address,
   the second backhaul link information is related to the second base station and to the transmitted address, the first backhaul link information comprises any or any combination of a first number of nodes, base stations and gateways associated with the mesh network intervening between the first base station and the transmitted address, and the second backhaul link information comprises any or any combination of a second number of nodes, base stations and gateways associated with the mesh network intervening between the second base station and the transmitted address.

4. The WTRU of claim 3, wherein the transmitter is further configured to transmit the address via at least one of a probe request frame, a special control frame, a data frame, or a broadcast frame.

5. The method of claim 1, wherein the transmitted address comprises any of an Internet Protocol (IP) address of the node with which the WTRU desires to connect, a medium access control (MAC) address of the node with which the WTRU desires to connect, a subnet address of the node with which the WTRU desires to connect, and an address for identifying a gateway from other gateways associated with the mesh network.

6. The method of claim 1, wherein the transmitted address is an address of any of (i) another WTRU and (ii) a node accessible via the internet.

7. The method of claim 1, wherein at least one of the base stations comprises a node-B.

8. The method of claim 1, further comprising: determining, as at least one of the end-to-end performance values, a throughput associated with the WTRU and the communication path.

9. The method of claim 1, wherein at least one of the plurality of backhaul link information further comprises any or any combination of (i) a number of hops separating the base station and a gateway associated with the mesh network, (ii) a number of nodes or base stations intervening between the base station and a gateway associated with the mesh network; (iii) a number of nodes and base stations intervening between the base station and a gateway associated with the mesh network; (iv) a number of routes separating the base station and a gateway associated with the mesh network; (v) an average transmission rate of each link between the base station and a gateway associated with the mesh network; (vi) an estimated throughput of each link between the base station and a gateway associated with the mesh network; (vii) channel occupancy perceived on each link between the base station and a gateway associated with the mesh network; (viii) radio resources allocated on each link between the base station and a gateway associated with the mesh network; and (ix) quality experienced on each link between the base station and a gateway associated with the mesh network.

10. The method of claim 1, wherein at least one of the plurality of backhaul link information further comprises any or any combination of (i) a number of hops separating the base station and the node having the transmitted address, (ii) a number of nodes, base stations or gateways associated with the mesh network intervening between the base station and the node having the transmitted address; (iii) a number of nodes, base stations and gateways associated with the mesh network intervening between the base station and the node having the transmitted address; (iv) a number of routes separating the base station and the node having the transmitted address; (v) an average transmission rate of each link between the base station and the node having the transmitted address; (vi) an estimated throughput of each link between the base station and the node having the transmitted address; (vii) channel occupancy perceived on each link between the base station and the node having the transmitted address; (viii) radio resources allocated on each link between the base station and the node having the transmitted address; and (ix) quality experienced on each link between the base station and the node having the transmitted address.

11. The method of claim 1, further comprising:
determining the respective radio link characteristics of the radio links between the WTRU and the base stations.

12. The WTRU of claim 3, wherein the transmitted address comprises any of an Internet Protocol (IP) address of the node with which the WTRU desires to connect, a medium access control (MAC) address of the node with which the WTRU desires to connect, a subnet address of the node with which the WTRU desires to connect, and an address for identifying a gateway from other gateways associated with the mesh network.

13. The WTRU of claim 3, wherein the transmitted address is an address of any of another WTRU and an address of a node accessible via the internet.

14. The WTRU of claim 3, wherein at least one of the base stations comprises a node-B.

15. The WTRU of claim 3, wherein the processor is further configured to: determine, as at least one of the end-to-end performance values, a throughput associated with the WTRU and the communication path.

16. The WTRU of claim 3, wherein at least one of the plurality of backhaul link information further comprises any or any combination of (i) a number of hops separating the base station and the node having the transmitted address, (ii) a number of nodes, base stations or gateways associated with the mesh network intervening between the base station and the node having the transmitted address; (iii) a number of nodes, base stations and gateways associated with the mesh network intervening between the base station and the node having the transmitted address; (iv) a number of routes separating the base station and the node having the transmitted address; (v) an average transmission rate of each link between the base station and the node having the transmitted address; (vi) an estimated throughput of each link between the base station and the node having the transmitted address; (vii) channel occupancy perceived on each link between the base station and the node having the transmitted address; (viii) radio resources allocated on each link between the base station and the node having the transmitted address; and (ix) quality experienced on each link between the base station and the node having the transmitted address.

17. The WTRU of claim 3, wherein at least one of the plurality of backhaul link information further comprises any or any combination of (i) a number of hops separating the base station and a gateway associated with the mesh network, (ii) a number of nodes or base stations intervening between the base station and a gateway associated with the mesh network; (iii) a number of nodes and base stations intervening between the base station and a gateway associated with the mesh network; (iv) a number of routes separating the base station and a gateway associated with the mesh network; (v) an average transmission rate of each link between the base station and a gateway associated with the mesh network; (vi) an estimated throughput of each link between the base station and a gateway associated with the mesh network; (vii) channel occupancy perceived on each link between the base station and a gateway associated with the mesh network; (viii) radio resources allocated on each link between the base station and a gateway associated with the mesh network; and (ix) quality experienced on each link between the base station and a gateway associated with the mesh network.

18. The WTRU of claim 3, wherein the receiver is further configured to: determine the respective radio link characteristics of the radio links between the WTRU and the base stations.

* * * * *